United States Patent
Batta

(10) Patent No.: US 7,720,464 B2
(45) Date of Patent: May 18, 2010

(54) SYSTEM AND METHOD FOR PROVIDING DIFFERENTIATED SERVICE LEVELS TO WIRELESS DEVICES IN A WIRELESS NETWORK

(75) Inventor: Puneet Batta, Santa Clara, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 566 days.

(21) Appl. No.: 11/391,626

(22) Filed: Mar. 28, 2006

(65) Prior Publication Data

US 2007/0230411 A1   Oct. 4, 2007

(51) Int. Cl.
*H04M 1/66* (2006.01)

(52) U.S. Cl. .................. 455/411; 455/410; 455/41.2; 370/338; 370/328

(58) Field of Classification Search ......... 455/410–411, 455/41.2, 452.2; 370/338, 270; 713/165, 713/171
See application file for complete search history.

(56) References Cited

U.S. PATENT DOCUMENTS

| | | | | |
|---|---|---|---|---|
| 5,790,536 | A * | 8/1998 | Mahany et al. | 370/338 |
| 5,933,773 | A * | 8/1999 | Barvesten | 455/411 |
| 6,591,095 | B1 * | 7/2003 | Palaniswamy et al. | 455/411 |
| 6,678,516 | B2 * | 1/2004 | Nordman et al. | 455/414.1 |
| 7,039,021 | B1 * | 5/2006 | Kokudo | 370/310 |
| 7,050,789 | B2 * | 5/2006 | Kallio et al. | 455/411 |
| 7,116,970 | B2 * | 10/2006 | Brusilovsky et al. | 455/411 |
| 7,280,517 | B2 * | 10/2007 | Benveniste | 370/338 |
| 7,292,842 | B2 * | 11/2007 | Suzuki | 455/411 |
| 7,515,569 | B2 * | 4/2009 | Prasad | 370/338 |
| 7,574,235 | B2 * | 8/2009 | Tu | 455/558 |
| 2004/0077336 | A1 * | 4/2004 | Lauriol | 455/411 |
| 2004/0137908 | A1 * | 7/2004 | Sinivaara et al. | 455/452.1 |
| 2004/0198319 | A1 * | 10/2004 | Whelan et al. | 455/411 |
| 2005/0232210 | A1 * | 10/2005 | Karaoguz et al. | 370/338 |
| 2005/0266826 | A1 * | 12/2005 | Vlad | 455/410 |
| 2006/0109826 | A1 * | 5/2006 | Zhang | 370/338 |

(Continued)

FOREIGN PATENT DOCUMENTS

EP    1 424 810    6/2004

(Continued)

OTHER PUBLICATIONS

Ala-Laurila et al., "Wireless LAN Access Network Architecture for Mobile Operators", IEEE Communications Magazine, Nov. 2001, vol. 39, pp. 82-89.

(Continued)

*Primary Examiner*—Sharad Rampuria

(57) ABSTRACT

Described is a system and method for providing differentiated service levels to wireless devices in a wireless network. The method comprises receiving, on a first network arrangement connected to a network, an authentication request from a wireless device. The network uses a first access protocol having a plurality of access categories and the wireless device uses a second access protocol. The authentication request including one of the plurality of access categories. The wireless device is verified to ensure that it is authorized to communicate at the one of the plurality of access categories. When the wireless device is verified as authorized, a response is communicated to a second network arrangement that indicates the one of the plurality of access categories is used for communications with the wireless device.

11 Claims, 2 Drawing Sheets

U.S. PATENT DOCUMENTS

2007/0155365 A1 * 7/2007 Kim et al. .................. 455/410

FOREIGN PATENT DOCUMENTS

EP    1 633 093       3/2006
WO    WO2007/112235   10/2007

OTHER PUBLICATIONS

Scarpa et al., "Adapative Techniques to Guarantee Qos in a IEEE 802.11 Wireless LAN", Vehicular Technology Conference, May 17, 2004, vol. A, pp. 3014-3018.

International Search Report dated Aug. 6, 2007 in related case PCT/US2007/064411.

Preliminary Report on Patentability dated Oct. 9, 2008 in related case PCT/US2007/064411.

* cited by examiner

SYSTEM AND METHOD FOR PROVIDING DIFFERENTIATED SERVICE LEVELS TO WIRELESS DEVICES IN A WIRELESS NETWORK

FIELD OF INVENTION

The present invention relates generally to systems and methods for providing differentiated service levels to wireless device in wireless networks.

BACKGROUND

Quality-of-Service ("QoS") is an important issue for the delivery of data in communications networks. Users expect to receive transmissions with an expected level of performance. The QoS maintains the level of performance when contingent conditions arise (e.g., network congestion).

Another important issue in the communications networks is backward compatibility of devices using legacy protocols. As the communications networks are improved, backward compatibility for legacy devices (which do not import the improvements in the communications networks) is highly desired. For example, an IEEE 802.11e protocol is an emerging wireless standard aimed at providing the QoS and thus, intends to replace older standards (e.g., 802.11a, 802.11b). Devices utilizing the older standards may be unable to take advantage of the improvements provided by the 802.11e protocol. Accordingly, a need exists for a system allowing the legacy devices to be more compatible with the 802.11e protocol by accessing the prioritized QoS.

SUMMARY OF THE INVENTION

The present invention relates to a system and method for providing differentiated service levels to wireless devices in a wireless network. The method comprises receiving, on a first network arrangement connected to a network, an authentication request from a wireless device. The network uses a first access protocol having a plurality of access categories and the wireless device uses a second access protocol. The authentication request including one of the plurality of access categories. The wireless device is verified to ensure that it is authorized to communicate at the one of the plurality of access categories. When the wireless device is verified as authorized, a response is communicated to a second network arrangement that indicates the one of the plurality of access categories is used for communications with the wireless device. a system and method for providing differentiated service levels to wireless devices in a wireless network.

DETAILED DESCRIPTION

Figure 1:
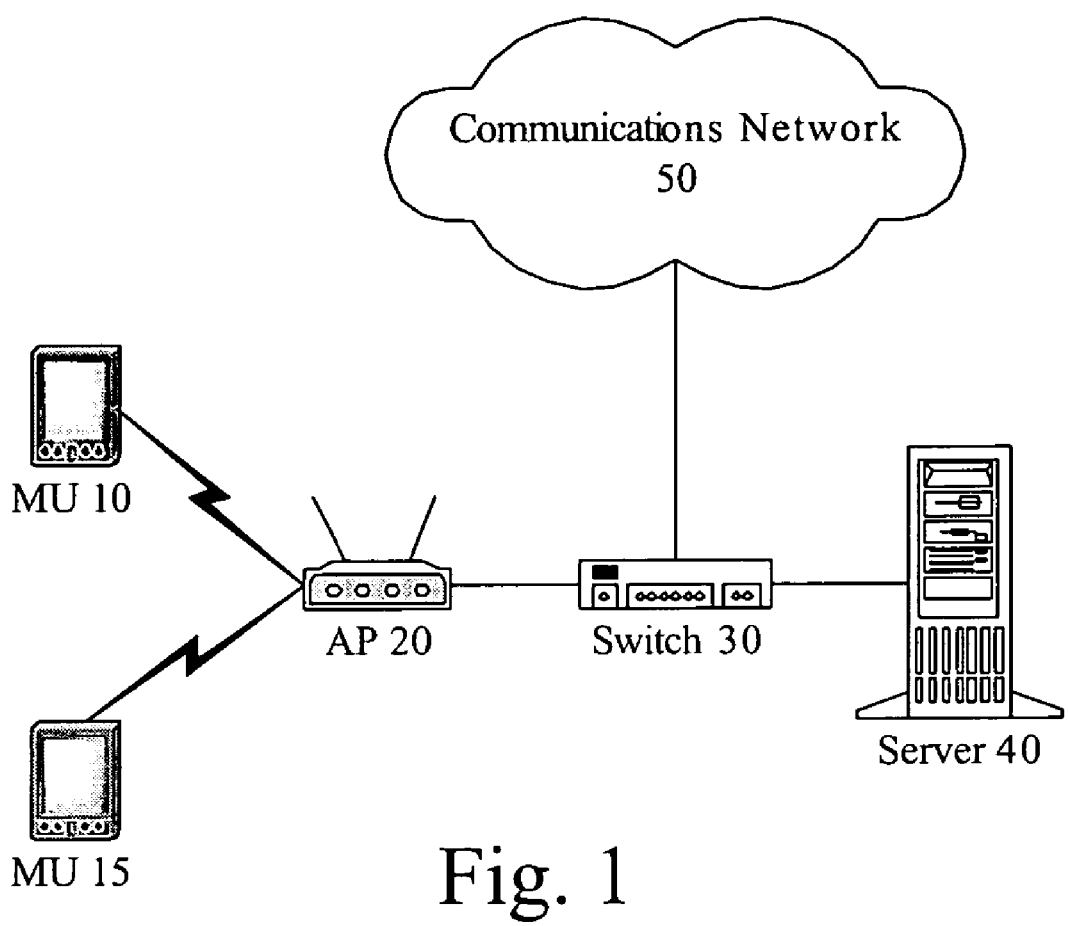
FIG. 1 shows an exemplary embodiment of a system according to the present invention.

The present invention may be further understood with reference to the following description and the appended drawings, wherein like elements are referred to with the same reference numerals. The present invention describes a system and a method for providing differentiated service levels to wireless devices in a wireless network. Although the present invention will be described with respect to a wireless network utilizing the IEEE 802.11x protocol(s) (e.g., 802.11e), those of skill in the art will understand that the present invention may be implemented in any wireless network, subnetwork and/or protocol which provides a Quality-of-Service ("QoS") capability. As known to those skilled in the art, the 802.11e protocol generally supports four priority levels (Voice, Video, Best Effort, and Background). An 802.11e application requesting the QoS is delivered the QoS in accordance with a corresponding priority level based on the data being sent/received by the device.

A legacy device (e.g., a device using an 802.11 protocol older than 802.11e) may be unable to take advantage of the QoS. That is, the legacy device is typically assigned a default priority level (e.g., best effort) regardless of the application. This may result in undesirable performance when, for example, the legacy device is executing an application which requires a higher level of service than the "best effort" (e.g., voice, video). Thus, the default priority level may be inadequate for these applications. Without a proper level of service, performance of the legacy devices may be adversely affected. The present invention enables the prioritized QoS from the 802.11e protocol (or any enhanced protocol) to be accessed by legacy devices, enabling more appropriate priority levels to be set for the legacy devices.

FIG. 1 shows an exemplary embodiment of a system 1 according to the present invention. The system 1 may include a network management arrangement (e.g., switch 30) coupled to a communications network 50 and to one or more access points/ports ("APs") 20. The network 50 may be any wired and/or wireless local/wide area network, Intranet, Internet, etc. The AP 20 may communicate wirelessly with one or more mobile units ("MUs") 10 and 15 according to a wireless communications protocol (e.g., 802.11x). The AP 20 may communicate with the switch 30 via a wired connection (e.g., an Ethernet cable). It should be noted that any device connected to the network may be referred to as a "network arrangement."

In the exemplary embodiment, the MUs 10, 15 include Voice over IP ("VoIP") phone capability. However, in other embodiments, the MUs 10, 15 may be any wireless computing device (e.g., a cell phone, a laptop, a PDA, a laser-/image-based scanner, an RFID reader, a network interface card, a cash register, etc.) which includes a transceiver for communicating wirelessly with the AP 20. The MU 10 may be a legacy device communicating using a first wireless protocol (e.g., an 802.11a protocol). The MU 15 may communicate using a second wireless protocol (e.g., the 802.11e protocol).

The switch 30 may be coupled to the communications network 50 and to a server 40 via wired connections. The switch may include hardware and/or software enabling communication between devices connected thereto. For example, the switch 30 may allow the MUs 10, 15 to access the communications network 50 and/or the server 40. In one embodiment, the switch 30 may be responsible for facilitating an authentication process. When the MUs 10, 15 submit an authentication request, the switch 30 receives the request and processes it accordingly. The authentication process will be described in detail below.

The server 40 may be an authentication server (e.g., a Remote Authentication Dial-In User Service, ("RADIUS") server) responsible for authenticating the MUs 10, 15. The server 40 may include one or more hardware components such as a processor, a memory, a network interface, etc. The server 40 may also be responsible for enforcing network policies by, for example, determining access categories assigned to the MUs 10, 15, as described below.

Figure 2:
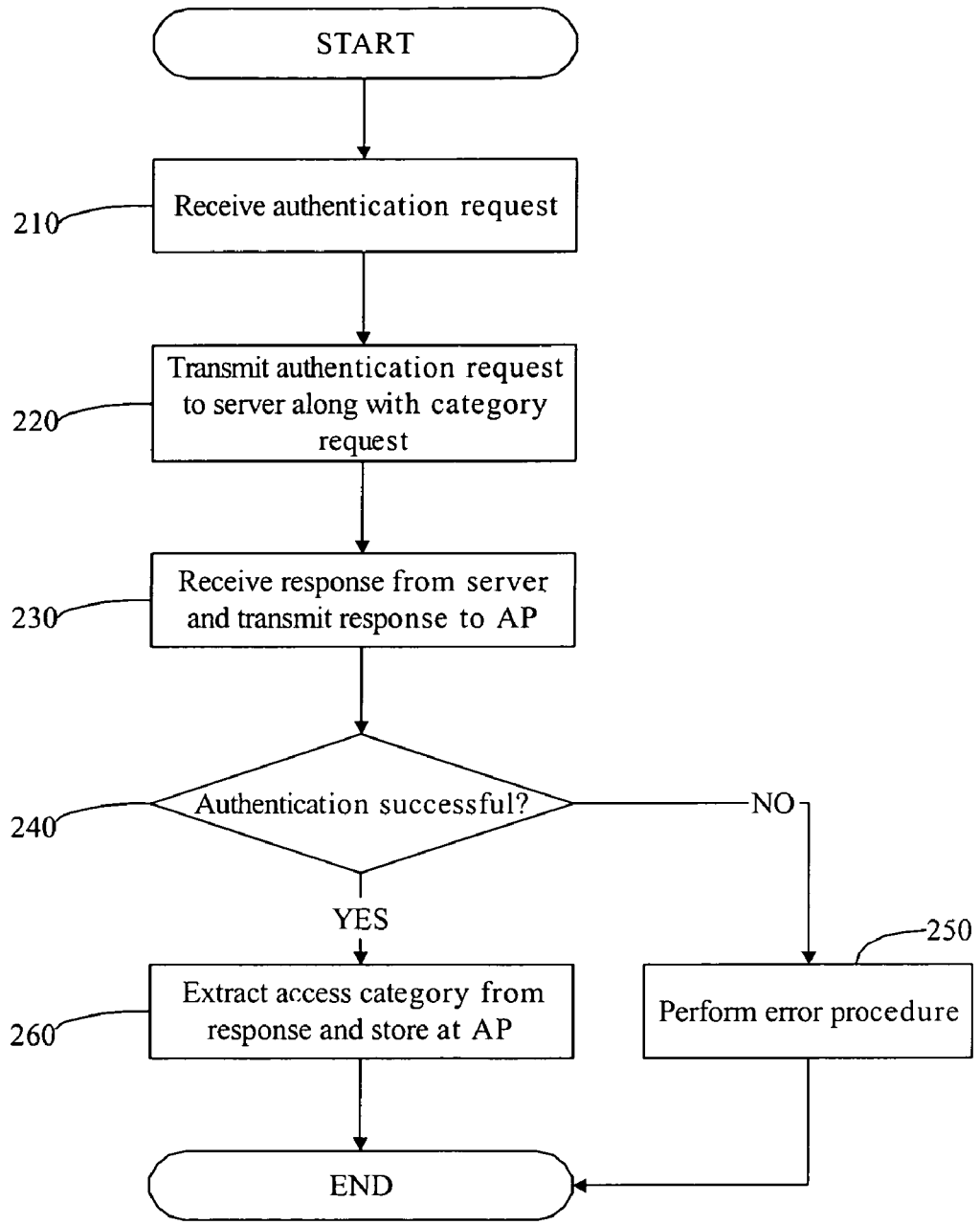
FIG. 2 shows an exemplary embodiment of a method according to the present invention.

FIG. 2 shows an exemplary embodiment of a method 200 according to the present invention. The method 200 will be described with reference to the system 1 of FIG. 1. In step 210, the switch 30 receives an authentication request from the MU 10. The authentication request may include user identification data (e.g., a username/password) and have been transmitted in order to gain access to network resources. For example, the authentication request may have been transmitted by the MU 10 because a user of the MU 10 desires access to the communications network 50.

In step 220, the switch 30 transmits the authentication request to the server 40 along with a category request for assignment of the access category to the MU 10, which may include information related to an expected access category. For example, the category request may include a hardware identifier which identifies a hardware type. Thus, in one exemplary embodiment, the hardware identifiers for the MUs 10, 15 may be "legacy VoIP device" and "non-legacy VoIP device", respectively. Those of skill in the art will understand that the category request may be generated as a function of an application to be executed by the MU 10 after being authenticated. For example, the category request may request a voice QoS for a VoIP application and a video QoS for a streaming video application. The category request may also be username-based. For example, the user may have been assigned an access category by a system administrator or the server 40 may have previously assigned an access category to the user.

In step 230, the switch 30 receives a response from the server 40 and transmits the response to the AP 20. The response may address the authentication request and/or the category request. If the response addresses the authentication request, a first message may be included indicating whether the MU 10 was authenticated successfully. The response may include one or more attributes which the server 40 assigns to the MU 10. For example, the attributes may include a virtual local-area network ("VLAN") tag, an IP address, etc. If the response addresses the category request (e.g., the authentication was successful), a second message indicates the access category assigned to the MU 10. The access category may also be included in the attributes. In the exemplary embodiment, the MU 10 is assigned the access category of at least "Voice" because it is a VoIP device. If the MU 10 were a barcode scanner, it may be assigned the access category "Best Effort" because it is not transmitting data which is latency-critical (e.g., voice, video, etc.). This ensures that the QoS provided to the MU 10 is delivered on a higher priority than if the access category was the default access category (e.g., "Best Effort").

In step 240, the AP 20 determines whether the authentication was successful by analyzing the first message. If the authentication was successful, the AP 20 examines the second message to determine the access category assigned to the MU 10. If the authentication was unsuccessful, the AP 20 may assume that the second message will indicate that the access category was not assigned. Alternatively, the AP 20 may check the second message and save any attribute information for later use (e.g., during a reattempted authentication request).

In step 250, the authentication was unsuccessful and the AP 20 performs an error procedure. The error procedure may include transmitting an alert to the MU 10 indicating that the authentication failed and optionally includes a reason for the failure (e.g., invalid username/password, insufficient access privileges, etc.).

In step 260, the authentication was successful, and the AP 20 identifies the access category from the response. The access category may be stored in a memory (e.g., a random access memory, a hard drive, etc.) and accessed whenever the MU 10 initiates wireless communications. In other embodiments, the access category may not be stored on the AP 20. For example, the access category may be stored on a database located at the server 40, on another server, at the switch 30, etc.

As understood from the above description, the present invention provides the QoS for devices using a protocol which does not provide the QoS. The present invention may also be successfully implemented with devices operating under any wired or wireless protocol which supports prioritized QoS. Using the access category, the legacy devices may be able to access the QoS at a priority level which is higher than the legacy devices would normally receive under the legacy protocols. Furthermore, the present invention allows for differentiation between the legacy devices. By assigning different access categories to the legacy devices, a network administrator can assign QoS in proportion to the needs of each legacy device, and is able to do so without modifying the legacy devices. Thus, the legacy devices can co-exist without competing for the same priority level (e.g., the default access category).

It will also be apparent to those skilled in the art that various modifications may be made in the present invention without departing from the spirit or scope of the invention. Thus, it is intended that the present invention cover the modifications and variations of this invention within the scope of the appended claims and their equivalents.

What is claimed is:

1. A method, comprising: receiving, on a authentication server connected to a network, an authentication request from a wireless device, wherein the network uses a first access protocol having a plurality of access categories and the wireless device uses a second access protocol, the authentication request including one of the plurality of access categories to be assigned and user identification data of the wireless device; verifying the wireless device is authorized to communicate at the one of the plurality of access categories; and communicating, when the wireless device is verified as authorized, a response to a second network arrangement that indicates the one of the plurality of access categories to be used for communications with the wireless device, wherein the second network arrangement is one of a wireless switch, an access point and an access port, wherein the plurality of access categories includes one of a voice category, a video category, a best effort category and a background category, and the response further includes at least one quality-of-service attribute to be assigned to the device.

2. The method of claim 1, wherein the second access protocol is a legacy protocol not including the plurality of access categories.

3. The method of claim 1, wherein the one of the plurality of access categories in the authentication request is based on an application being executed by the device.

4. The method of claim 1, wherein the first access protocol is an IEEE 802.11e protocol.

5. The method of claim 1, wherein the wireless device is one of a mobile computing device, a PDA, a mobile phone, a laptop computer, a scanner, an RFID reader, a network interface card, a cash register and a bar code reader.

6. The method of claim 1, wherein the authentication request further includes one of (i) a password, (ii) a username, (iii) a certificate and (iv) a token card.

7. The method of claim 6, wherein the one of the plurality of access categories in the authentication request is based on the username in the authentication request.

8. A system, comprising: a first network arrangement connected to a network to receive an authentication request from a wireless device, wherein the network uses a first access protocol having a plurality of access categories and the devices uses a second access protocol, the authentication request including one of the plurality of access categories to be assigned and user identification data of the wireless device; and a authentication server connected to the network to receive the authentication request from the first network arrangement, verify the wireless device is authorized to communicate at the one of the plurality of access categories and communicate, when the wireless device is verified as authorized, a response to the first network arrangement that indicates the one of the plurality of access categories to be used for communications with the wireless device, wherein the first network arrangement is one of a wireless switch, an access point and an access port, wherein the plurality of access categories includes one of a voice category, a video category, a best effort category and a background category and the response further includes at least one quality-of-service attribute to be assigned to the device.

9. The system of claim 8, wherein the one of the plurality of access categories in the authentication request is based on one of an application being executed by the device and a username included in the authentication request.

10. The system of claim 8, wherein the first access protocol is an IEEE 802.11e protocol.

11. A system, comprising: a first means connected to a network for receiving an authentication request from a wireless device, wherein the network uses a first access protocol having a plurality of access categories and the wireless device uses a second access protocol, the authentication request including one of the plurality of access categories to be assigned and user identification data associated with the wireless device; and a second means connected to the network for receiving the authentication request from the first means, verifying the wireless device is authorized to communicate at the one of the plurality of access categories and communicating, when the wireless device is verified as authorized, a response to the first means that indicates the one of the plurality of access categories to be used for communications with the wireless device, wherein the plurality of access categories includes one of a voice category, a video category, a best effort category and a background category and the response further includes at least one quality-of-service attribute to be assigned to the device.

\* \* \* \* \*

UNITED STATES PATENT AND TRADEMARK OFFICE
CERTIFICATE OF CORRECTION

| | | |
|---|---|---|
| PATENT NO. | : 7,720,464 B2 | Page 1 of 1 |
| APPLICATION NO. | : 11/391626 | |
| DATED | : May 18, 2010 | |
| INVENTOR(S) | : Batta | |

It is certified that error appears in the above-identified patent and that said Letters Patent is hereby corrected as shown below:

ON THE TITLE PAGE

On Page 2, in Field (56), under "OTHER PUBLICATIONS", in Column 2, Line 1, delete ""Adapative" and insert --"Adaptive--, therefor.

On Page 2, in Field (56), under "OTHER PUBLICATIONS", in Column 2, Line 1, delete "Qos" and insert --QoS--, therefor.

IN THE SPECIFICATION

In Column 2, Lines 50-51, delete "The switch" and insert --The switch 30--, therefor.

Signed and Sealed this
Twenty-ninth Day of May, 2012

David J. Kappos
*Director of the United States Patent and Trademark Office*